United States Patent
Heinberg et al.

(10) Patent No.: US 6,364,667 B1
(45) Date of Patent: Apr. 2, 2002

(54) TECHNIQUES FOR MASTERING A BODY OF KNOWLEDGE BY WRITING QUESTIONS ABOUT THE BODY OF KNOWLEDGE

(75) Inventors: Paul Heinberg; Mark Marabella, both of Honolulu, HI (US)

(73) Assignee: Relational Technologies LLP, Honolulu, HI (US)

(*) Notice: Subject to any disclaimer, the term of this patent is extended or adjusted under 35 U.S.C. 154(b) by 0 days.

(21) Appl. No.: 09/399,988

(22) Filed: Sep. 20, 1999

Related U.S. Application Data (63) Continuation-in-part of application No. 08/818,664, filed on Mar. 14, 1997, now Pat. No. 5,954,516.

(51) Int. Cl.[7] .............................. G09B 3/00; G09B 7/00
(52) U.S. Cl. ...................................... 434/322; 434/353
(58) Field of Search .................................. 434/322, 323, 434/327, 335, 336, 350, 353, 354, 362, 363

(56) References Cited

U.S. PATENT DOCUMENTS 5,836,771 A * 11/1998 Ho et al. ..................... 434/362
5,934,910 A *  8/1999 Ho et al. ..................... 434/362

* cited by examiner

*Primary Examiner*—John Edmund Rovnak
(74) *Attorney, Agent, or Firm*—Gordon E. Nelson (57) ABSTRACT

A person's mastery of a body of knowledge is determined by having the person write objective questions for a test that is given to a group of test takers. The results of the test are then analyzed to determine how well the person's questions discriminated between those who did well on the test and those who did poorly. The better the questions discriminate, the more mastery the person has of the body of knowledge. In a learning situation, a cycle of study, writing questions, analyzing the results, and determining mastery may be repeated until the desired degree of mastery is reached. The technique may be used for individuals or groups and both the question writers and the test takers may work in teams. Question writers may also be test takers, and the evaluation of a question writer may reflect both the extent to which his or her questions discriminate and his or her performance on the test. Any medium may be used for communication between the question writers, test takers, and the parties making and giving the tests. One particularly active alternative is communication via electronic mail, with test taking being done interactively on the Internet. Also disclosed are using a test taker's ability to predict how well a question will discriminate to evaluate him or her, techniques for evaluating interactively-answered questions, and techniques for forming a community of persons using the technique to learn a body of information.

8 Claims, 5 Drawing Sheets

TECHNIQUES FOR MASTERING A BODY OF KNOWLEDGE BY WRITING QUESTIONS ABOUT THE BODY OF KNOWLEDGE

CROSS REFERENCES TO RELATED APPLICATIONS

The present patent application is a continuation-in-part of U.S. Ser. No. 08/818,664, Dr. Paul Heinberg, Method of using question writing to test mastery of a body of knowledge, filed Mar. 14, 1997, which will issue as U.S. Pat. No. 5,954,516 on Sep. 21, 1999. The present patent application contains the entire Detailed Description and Drawing of its parent; the new material begins with the section titled MASTERY communities.

BACKGROUND OF THE INVENTION

1. Field of the Invention

The invention concerns methods of organizing people for mastering a body of knowledge and improved techniques for evaluating a person's mastery of the body of knowledge by having the person write questions about it.

2. Description of the Prior Art

One of the most efficient ways of finding out whether someone has mastered a body of knowledge is to give the person a test made up of questions about the body of knowledge and seeing how well the person has answered the questions. In a society which values opportunity and fairness on the one hand and requires technical competence on the other, testing has become enormously important. Test results determine not only an individual's access to educational opportunities or to trades and professions, but are also used to determine the quality of the institutions where the individuals receive their training.

One consequence of the ubiquity and importance of tests in our society has been the development of techniques for validating the questions used in the tests. What is at issue in validation is how well the question discriminates those who have mastered the subject matter in question from those who have not. One technique for validation is dividing the test takers into three groups according to the number of right answers they gave in their tests. The first group contains the test takers that did best; the second group contains the test takers that did worst; the third group contains the average test takers. A given question is validated by comparing the percentage of takers in the first group that answered the question correctly with the percentage of takers in the second group that answered it correctly; the larger the percentage of the first group relative to the second group, the better the question discriminates. See Truman J. Kelley, "The Selection of Upper and Lower Groups for the Validation of Test Items", *Journal of Educational Psychology*, Vol. 30, 1939, 17–24.

Another consequence has been the development of "objective" testing, that is, testing where the test grader's subjective opinion of the student or of the work he is correcting has no influence on the grade. Examples of objective tests are true-false tests or multiple-choice tests. Objective tests have two advantages: first, they ensure fairness in test grading if not in test making; second, they permit automation of the whole process of taking tests, grading tests, and evaluating tests. The automation possible with objective tests has made it possible to administer tests such as the Scholastic Aptitude Test, the Law School Admissions Test, or the Multi-state Bar Examination to enormous numbers of people; it has also lead to the development of a large industry devoted to developing, validating giving, and grading automated tests.

While objective tests have traditionally been given and graded in batch mode, that is, a group of test takers takes the test using a machine-gradable answer sheet, the sheets are collected, the machine grades them, and the result is returned to the students, the enormous reduction in the cost of computers has also made it possible to give objective tests interactively: the student sits at a terminal, receives each question and the possible answers in turn, and selects a response. The computer to which the terminal is connected can immediately respond to the answer; for example, the computer may terminate the test early if the taker has already done enough to demonstrate his or her competence or incompetence or may determine from the results thus far what areas require further testing and present more questions in those areas.

Automated objective tests have certainly increased the amount and fairness of access to opportunity. Automation has made it possible for enormous numbers of people to take the tests and has also made it possible for them to take the tests literally anywhere. Further, the results of properly-made objective tests have turned out to be good indicators of the taker's mastery of a body, of knowledge and of the taker's probable success in applying the knowledge. It has thus become possible for an institution of higher learning, for example, to make a rational judgment about admitting a student about whom the institution of higher learning knows nothing beyond the test scores.

While the success of objective testing is undeniable, objective tests as heretofore made and used have a number of problems. At the root of these problems is the fact that a student's ability to answer in an objective test is necessarily limited to choosing among the responses offered by the test writer. There is no opportunity for the student to actively demonstrate what he or she can do with the subject matter. One consequence of this fact is that taking objective tests is much less interesting than taking other kinds of tests. Another is that students often spend more time and effort figuring out how to "work" an objective test than they do learning the subject matter. Another, more serious consequence, is that if there is a mismatch between what the student knows and what the test asks, there is no way for the student to get outside the questions provided him or her and show what he or she can really do.

The invention of the parent of the present patent application effectively solved the aforementioned problems of objective tests. Further work has, however improved upon the invention of the parent.

SUMMARY OF THE INVENTION

One improvement has been increased understanding of the use of the techniques of the parent in forming communities of people interested in learning about a corpus of material. In such a community, evaluation of mastery involves both the ability of members to write questions about the corpus that discriminate between test takers who do well and those that do not and the ability of members to answer questions about the corpus. Since members of the community are both writing and answering questions, a further measure of mastery is the ability of a community member to predict whether a question will discriminate.

Networks such as the World Wide Web have made membership in a community easier than ever before, and have made it possible to answer questions interactively. This has resulted in improvements such as taking the number of attempts to answer a question into account in determining mastery and organizing community members to provide help to one another.

Other objects and advantages will be apparent to those skilled in the arts to which the invention pertains upon perusal of the following Detailed Description and drawing, wherein:

BRIEF DESCRIPTION OF THE DRAWING

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

Figure 1:
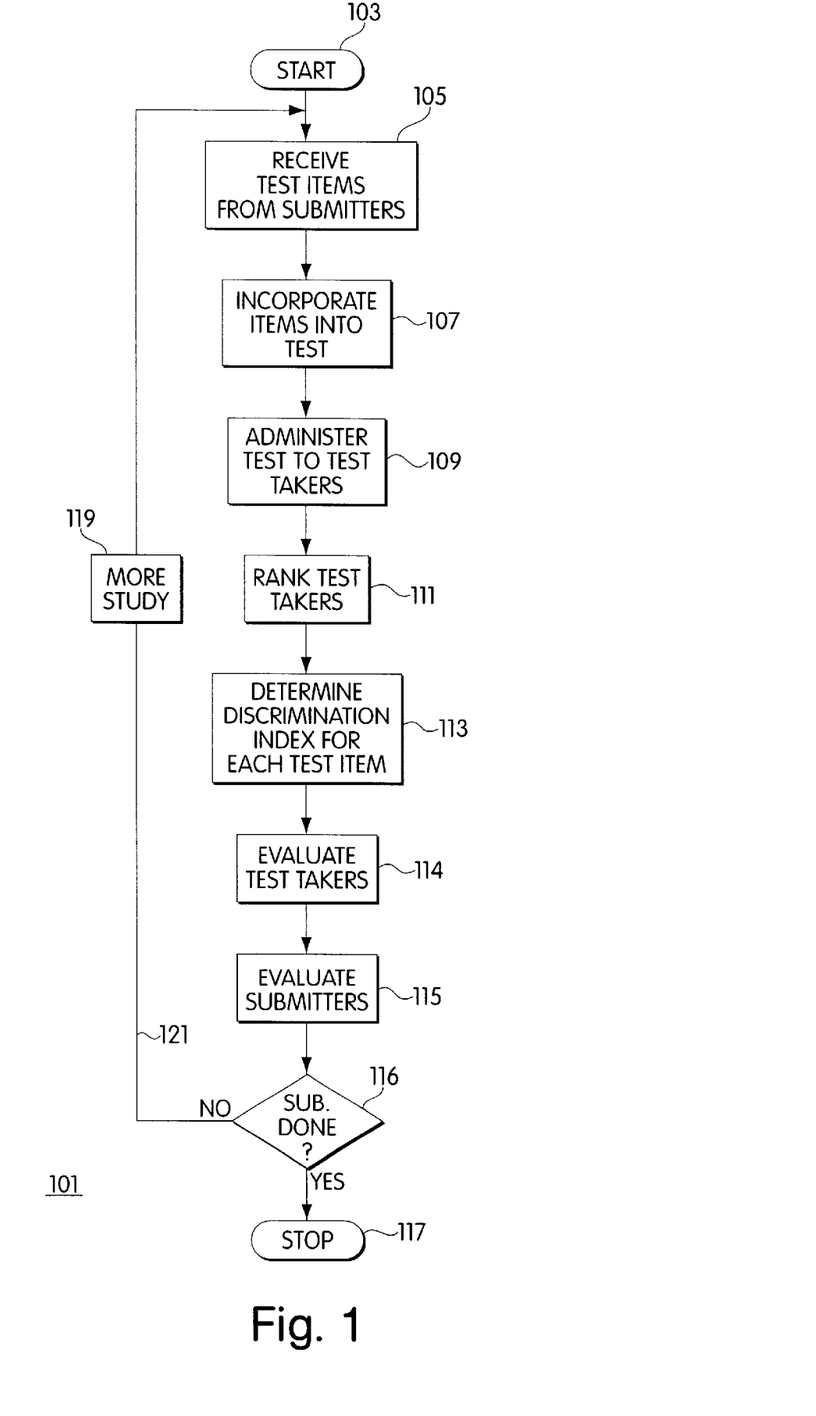
FIG. 1 is a high-level flowchart of the method of the invention.

The following Detailed Description of a preferred embodiment includes the entire Detailed Description of the parent. The description of the improvements begins with the section titled Mastery communities.
Overview of the Method: FIG. 1

FIG. 1 presents an overview of the invention. As indicated in the Summary of the Invention, the invention is a technique for determining a person's mastery of a subject matter by having the person submit objective questions which are then used in a test. The test results are analyzed to determine how well the submitted questions discriminate between test takers who know the subject matter and those who do not, and the mastery of the submitter is rated according to how well his or her questions discriminate.

As shown on at 105 in FIG. 1, the first step of the method is to receive test items from the submitters whose mastery of the subject matter is being determined. The submitter indicates for each test item what he or she regards as the correct answer. The second step is to make an objective test using the test items (107). The third is to administer the test to test takers (109). The test takers may or may not include question submitters; where they do, it is advisable to make sure that the question submitters do not see their own questions (though, as will be pointed out in the discussion of cheating below, the fact that a test taker knows the answers to his or her own questions does not necessarily increase the degree to which the questions will discriminate).

Next, the test takers are ranked by the number of "correct" answers that they had on each test (111). Thereupon, the rankings of the test takers are used to determine a discrimination index for each test item (113). The discrimination index is used to determine how well each test item discriminated between test takers who did well on the test and those who did poorly. Then the performance of the test takers is evaluated (114) (this is not necessary to evaluate the question submitters, but is a useful byproduct of the fact that a test and test takers are required to evaluate the question submitters). Thereupon, the discrimination indexes for the test items submitted by each submitter are used to evaluate the submitter's knowledge of the subject matter. In general, the better the submitter is at writing test items that discriminate well, the greater the submitter's degree of mastery of the subject matter. Of course, if the submitter was also a test taker, he or she may be evaluated both on the basis of his or her success at answering test questions and on the basis of his or her success at writing them. If the evaluation of the submitter demonstrates the submitter's mastery of the subject matter to the evaluator (who may of course be the submitter), the submitter need not continue and the method branches at 116 to 117; otherwise, it branches to 121, the student devotes more effort to mastering the subject matter (119) and the student repeats steps 105 through 116.

The method just described can be used to test both for rote knowledge and for structural knowledge. An item that tests rote knowledge is defined as an item for which the majority of a small group of persons who are literate but are unfamiliar with that field can, given enough time, cite the location of the "correct" answer to that item in the source materials that the test is based on. The method can thus be used to test for rote knowledge by not allowing Test takers access to any of the source materials during testing, or to so limit the time available for test-taking that no time is available for searching in the source materials.

An item that tests structural knowledge is one for which the "correct" answer cannot be located via patient scanning of the provided source materials by literate laypeople. An item that tests structural knowledge requires the Test takers to make fine discriminations among fundamental concepts in that field, and/or to perceive the nature of relationships among concepts, and/or to assign examples to one of a set of concepts, and/or to select which of a set of concepts fits a given example, and/or to select the most appropriate analogy, and/or to generate information via any other kind of cognitive processing to discover the "correct" answer which cannot otherwise be discovered via patient scanning of the source materials. The testing system can thus be used to test level of mastery of structural knowledge in a field by allowing Test takers full access to all of the source materials during testing.

As for the Item submitters, they are graded on how well their questions discriminate, and in situations where the Test takers have full access to the source materials, only carefully made structural items will discriminate effectively. Of course, writing a good structural item requires even more mastery of the source materials than answering one.

While the underlying principle of the method, namely, using someone's skill at writing questions about a subject matter area to judge his or her knowledge of the subject matter, could be used with any kind of question that was amenable to grading, the questions used in the preferred embodiment are objective questions, that is, questions for which the grader has an objective indication of what the "correct" answer is. A major advantage of objective tests is that they can be automated, and the method of FIG. 1 can be practiced using any of the automation techniques available for giving objective tests. Thus, where large groups are involved, the test taking and grading techniques developed for tests such as the Scholastic Aptitude Test can be employed. The tests can of course also be given on an individual basis, and in the age of the personal computer and the Internet, one particularly attractive option is using E-mail to receive questions and communicate test results, using interactive HTML pages on the World Wide Web to administer the test, and using a computer to grade the test.

The method of the invention can of course be used for any purpose that testing is generally used for, but its best application is in testing done as a learning tool. The reason for this is that writing questions is not only an excellent way of showing what one knows, it is also an excellent way of learning. Generally, all that is required for the method is a group of participants who have agreed to study a particular body of knowledge and then to be tested for mastery of that body of knowledge. One more obvious example of such a group is a group of people that are preparing for a professional examination such as the Bar Examination. Another example is a group with a shared private interest, for example baseball fans, who desire to learn more about their area of interest. A particular advantage of the method in this situation is that the group can use it to teach itself. The method does not require someone with special knowledge to function as a test author, test grader, or evaluator of the knowledge of the group members, although a system monitor, or SM may be useful to make sure that the mechanics of the method are properly carried out.

The method is further in no way dependent on how the body of knowledge is presented to the participants. The body of knowledge may be simply printed materials, it may be visual or audio materials, it may be interactive, and it may be made available to the learners by any means whatever.

Participants in the Method

There are two kinds of Participants: Test takers, who take tests, and Item submitters, who submit items for the tests. Test takers may operate as individuals or as teams and the same is true of the Item submitters. Hence, for example, for 36 Participants, there could be 36 Item submitters, each of whom submits one item, 18 Item submitting teams, each of which submits 2 items, or 12 such teams, each of which submits 3 items. The number of Item submitters may vary greatly from a low of as few as approximately 6 up to many thousands, but for most purposes a size of approximately 12 to 40 Item submitters may occur by enrollment or be required by the system monitor and/or supervisor(s), based on educational, economic and other factors.

The Test Items

A submitted ITEM is a MULTIPLE-CHOICE test question consisting of from 2 to n foils (alternative responses) together with the item submitter's identification of the "correct" answer. Each Item submitter should be required to adhere to pre-specified rules that specify item format, such as n (maximum number of foils), whether foils are to be numbered or alphabetized, maximum line and item length, indentations, where and how the identification of the "correct" answer is to be made, etc., and rules that specify the required style of item construction. Style characteristics should be specified to minimize the difficulty in test-taking that would tend to ensue with the Test takers having to read succeeding questions written in different styles.

To increase the randomness in terms of which foil in the sequence of foils is the "correct" answer to each submitted item, Item submitters may be required to arrange the foil sequences for their submitted items such that a different letter or number is indicated as the "correct" answer for each of their submitted items. Or the System manager may notify Item submitters that the sequence of foils on any submitted item may be rearranged by the System manager to increase the randomness in the sequence of "correct" answers.

The number of items that an item submitter may submit for the test depends upon, among other factors, the difficulty level of the subject matter, the number of Test takers, and the time allowed for Test takers to take the test (which can vary from less than one hour to many weeks). Items for the test may be submitted by hand, faxed or mailed to the same address, telecommunicated such as via E-mail or via a computer and a modem to a properly programmed mainframe computer, or by any other means that tends to assure arrival of all items for that test to a particular destination by a specified date and time.

If the participants know one another (which they would not if, for example, the group were a random sub-set of a large and widely distributed population), it is generally desirable to minimize the ability of Test takers to identify which items were submitted by which of their acquaintances. In that case, upon arrival of all items for the test, those items should be arrayed such that each of the individuals' or teams' submitted items appears approximately (but not exactly) equidistant from one another in terms of item number assigned to that submitter's items.

Tests and Test Takers

The DP (data-processor: a human or a computer program) numbers each item, records the submitter's identification of the correct answer for each item, and adds any other pertinent information such as test name, blanks for the name and code of each Test taker, etc., and then distributes the test to the Test takers, as printed copies or displayed on each Test taker's view screen, or by any other means. For example, if each item is submitted on a separate card, cards may be numbered and then cut and pasted onto test pages, and then those pages can then be photocopied to constitute printed copies of the test.

Just as Item submitters may be teams or individuals, Test takers may be teams or individuals, and the Test takers may be the same persons who were the Item submitters or the Item submitters and Test takers may be different partly or entirely from each other. For example, a group of 40 Participants can be divided into Subgroups A and B of 20 each such that the 20 in Subgroup A are Item submitters for the test taken by Subgroup B, and vice versa.

Administering the Tests

The full contents of all items except the correct answers identified by the submitters for those items can be displayed to all Test takers for the entire duration of the test, in which case it can be said that each Test taker is in control of how much of the allowed total test time is given to each test item. Or the stem for each item (information preceding the list of foils) can be displayed to each Test taker for a certain amount of time (such as being projected on a movie screen or displayed at each Test taker's computer terminal), followed by the display of that item's list of foils for a fixed amount of time, and this process is repeated for each successive item. Or the foils for each item may be displayed thus to each Test taker, followed by the redisplay of the stem for that item for a fixed amount of time. In such cases, it can be said that the System Monitor is in control of the distribution of allowed test time to each test item.

A means is provided for each Test taker to indicate her, his or their answer (choice among foils or non-response) to each test item. As examples, the test can be distributed in printed form to each Test taker together with an electronically or manually scoreable answer sheet, or a printed copy of the test can be provided to each Test taker with the answer to each item to be electronically transmitted to the computer that is programmed to run the system as soon as that Test taker selects that answer, or Test takers may have a choice of transmittal media, including the right to telephone to a recorder or transcriber a Test taker's responses. Hence, the locale at which each Test taker provides responses may be at each Test taker's home or at one or more sites where one or more response transmission devices of the same or various kinds are located.

Figure 2:
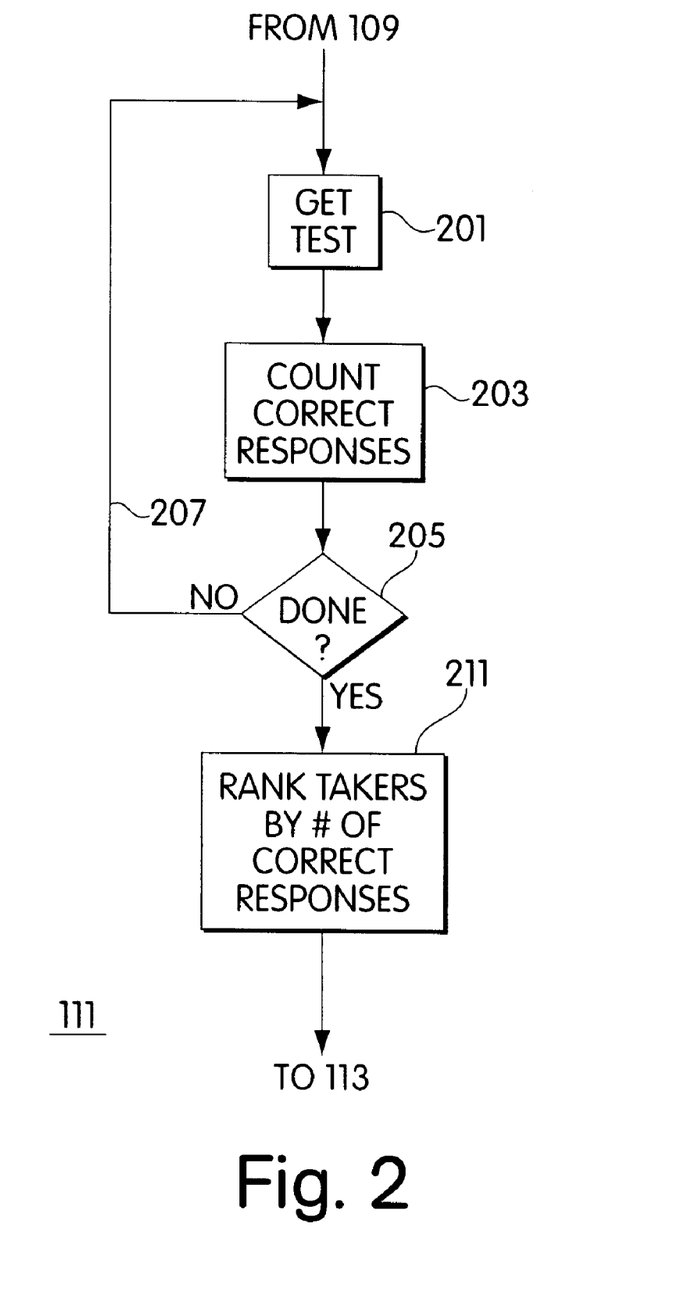
FIG. 2 is a detailed flowchart of block 111 of the flowchart of FIG. 1.

Ranking Test Takers: FIG. 2

After the specified deadline for receipt of the responses of each Test taker, the DP records the NTT (number of test-takers), the name and/or code for each, and each response of each Test taker. Since the DP has previously recorded the submitter's identification of the correct answer for each item, those data constitute the "correct" answers for that test. That information enables the data processor to perform the steps of FIG. 2. The data processor takes each test in turn (block 201) and counts the number of responses made by that Test taker that agree with the submitter's identified correct answer for the item (block 203). As shown at decision block 205 and branch 207, this process continues until all of the tests have been processed. The data processor then ranks each Test taker's test from 1 (highest number of "correct" responses) to NTT (lowest number of "correct" responses) (block 211). In case of ties, conventional ranking procedures should be followed. That is, the ranks assigned to tied scores will sum the same as the ranks that would be assigned were those scores not tied. E.g, if 3 scores are tied for 5th, 6th and 7th, each will be assigned the rank of 6th, and if 2 scores are tied for 5th and 6th, each will be assigned the rank of 5.5.

Figure 3:
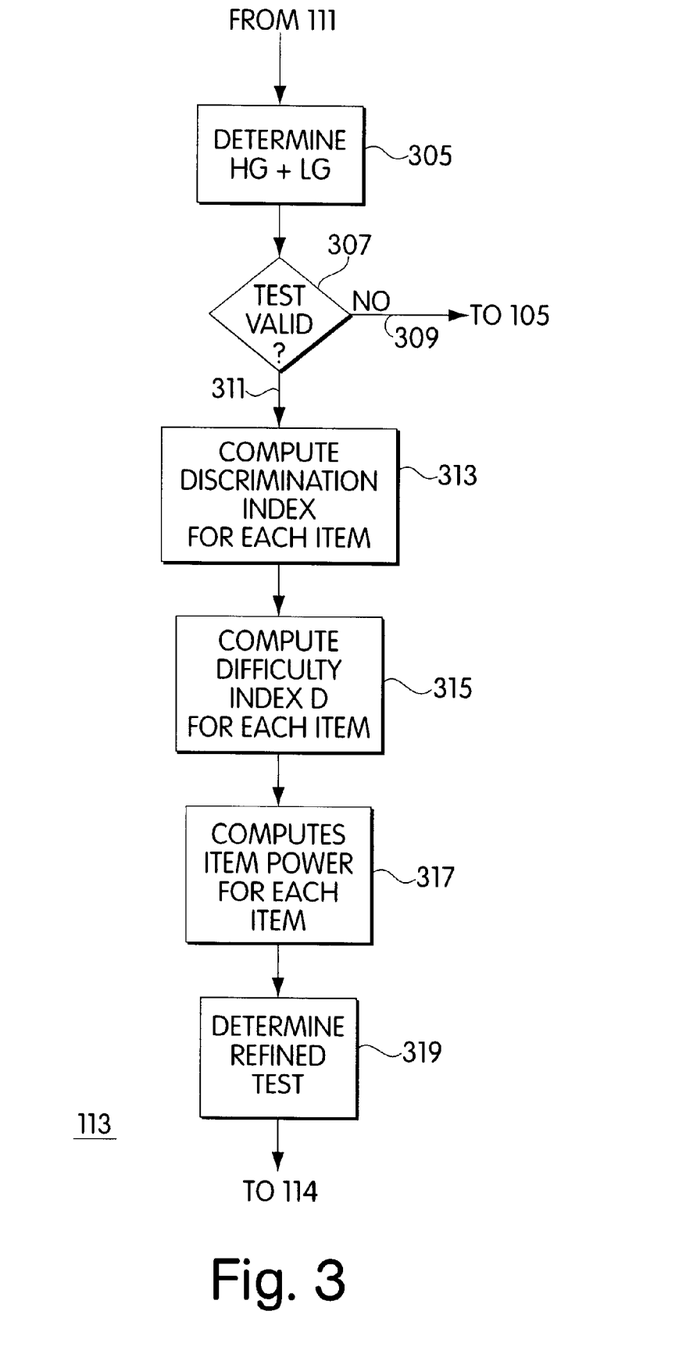
FIG. 3 is a detailed flowchart of block 113 of the flowchart of FIG. 1.

Determining the Quality of the Test Items: FIG. 3

The flow chart of FIG. 3 shows how the quality of each test item is determined in a preferred embodiment. First, the test takers are divided into three groups based on the ranks of their tests: a middle group, a high group, and a low group (block 305). The high group and the low group are of equal size. Then the difference in scores between the high and low groups is examined (block 307). If it is not great enough, the test is invalid and a new test must be made and given, so branch 309 is taken. Otherwise, branch 311 is taken. At block 313, the discrimination index for each test item is computed; at block 315, the difficulty index is computed; at block 317, the item power is computed; at block 319, finally, a refined test containing those questions of the highest quality is determined. In the following, each of these steps will be explained in more detail.

Beginning with the division into groups, the highest and lowest group should preferentially constitute approximately twenty-seven percent (27%) of the NTT. This percentage has been found to give maximum predictability of the total test scores from a knowledge of the responses to that item. (See Kelley, Truman J., "The Selection of Upper and Lower Groups for the Validation of Test Items," *Journal of Educational Psychology,* Vol. 30, 1939, 17–24, and Johnson, A. Pemberton, "Notes on a Suggested Index of Item Validity: The U-L Index," *Journal of Educational Psychology,* Vol. 42, 195 1, pp. 499–505). With small NTT's the number of those in the Highest group (HG) plus the number of those in the lowest group (LG) may be considerably larger than 54%.

All Item submitters and Test takers should be informed that if the distribution of test scores is such that a high group and low group of at least 3 each cannot be determined, the test is invalid and a new test made from new questions must be made and given.

If the test is found to be valid, the DP tabulates the total number of responses to each foil for each item made by the Highest group, and the total number of responses to each foil for each item made by the Lowest. These data will be among the data and statistics that will be provided to each Participant, Item submitter, and Test taker. Each item's DISCRIMINATION INDEX, k, is then computed. Where $C_{HG}$ is the number of "correct" responses to that item made by the Highest group, where $C_{LG}$ is the number of "correct" responses to that item made by the Lowest, where NHG is the number of test-takers in the Highest group, where NLG is the number of test-takers in the Lowest, and where NG=NHG=NLG, $$k=(C_{HG}-C_{LG})/NG$$

An item with an ideal k is one for which $C_{HG}$=NHG and $C_{LG}$=0. The value of k for any item can range from a maximum of +1.00 to a minimum of −1.00.

Next, each item's DIFFICULTY INDEX, D, is computed. The Difficulty Index for an ideal item is such that exactly one-half of the total number in the two groups (NHG+NLG) answer that item "correctly." The ideal D of 0.50 is due to the fact that the ideal item is one for which $C_{HG}$=NHG and $C_{LG}$=0. The Difficulty Index (nearness to ideal difficulty) is computed thus:

If ($C_{HG}+C_{LG}$) is less than or equal to NG, then:

$$D=(C_{HG}+C_{LG})/2NG$$

If ($C_{HG}+C_{LG}$) is greater than NG, then:

$$D=[2NG-(C_{HG}+C_{LG})]/2NG$$

The value of D can range from a maximum of 0.50 to a minimum of 0.00.

The ITEM POWER, IP, of any item can be defined for the group as IP=k, or as IP=100 kD, or as any particular weights, a and b, for k and D (i. e., IP=100akbD).

The AVERAGE ITEM POWER (AIP) of the items provided by each Item submitter (individual or team) is then computed. It is simply the average of the Item Powers for the items.

The RAW TEST includes all items that were included on the test. Each Test taker's RAW SCORE is the number of items on the entire test (Power Items plus other items) which that Test taker answered "correctly." A POWER ITEM, PI, is defined for the group as any item whose power equals or exceeds a specified value. For example, if P=100kD, a PI can be defined as any item whose P is at least +12. The REFINED TEST is defined as the test consisting only of the Power Items.

Grading

The final step is grading each Participant. Those who are Test takers receive grades based on how well they did on the test; those who are Item submitters receive grades based on the quality of the questions they submitted.

Figure 4:
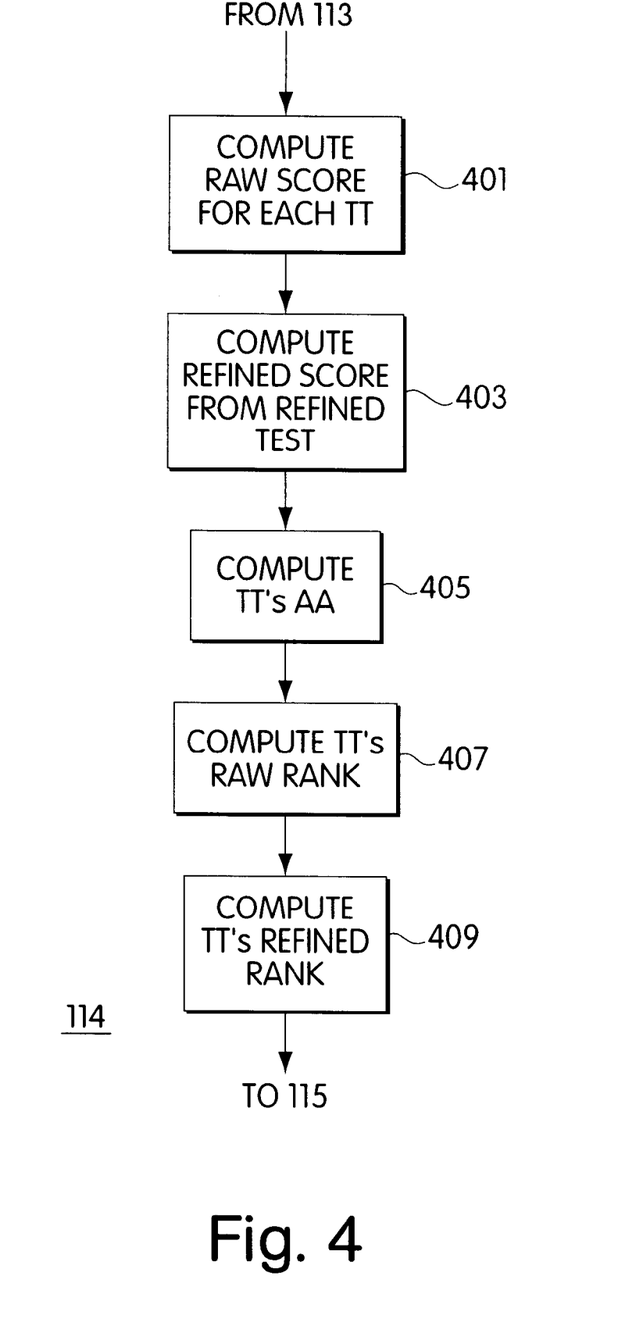
FIG. 4 is a detailed flowchart of block 114 of the flowchart of FIG. 1.

Grading the Test Takers: FIG. 4

FIG. 4 shows the steps involved in grading the Test takers. The first step, 401, is to compute the raw score for each Test taker. Then the REFINED SCORE is computed from the previously-determined REFINED TEST (403). That done, the test taker's absolute achievement (405), raw rank (407), and refined rank (409) are computed. Each of these steps is explained in more detail in the following.

The DP begins by rescoring every Test taker's test (not just those in the HG and LG) in terms of the number of items on the Refined Test that were answered "correctly" by that Test taker. Each Test taker's REFINED SCORE is the number of items on the Refined Test which that Test taker answered "correctly." Each Test taker's absolute level of achievement on the test is that Test taker's score on the Raw Test, or score on the Refined Test, or some mathematical combination of those two scores. If one measure of absolute achievement (AA) is desired, it can be any mathematically weighted combination of those two scores (i. e., AA aRAWSCbREFINSC).

Each Test taker's RAW RANK (relative level of achievement compared with all of the other Test takers in the group)

is the rank of that Test taker's score on the Raw Test. Each Test taker's REFINED RANK is the rank of that Test taker's score on the Refined Test. If one measure of relative achievement (RA) is desired, it can be any mathematically weighted combination of those two ranks (i. e., RA=aRAWRKbREFINRK).

Grading Item Submitters

Figure 5:
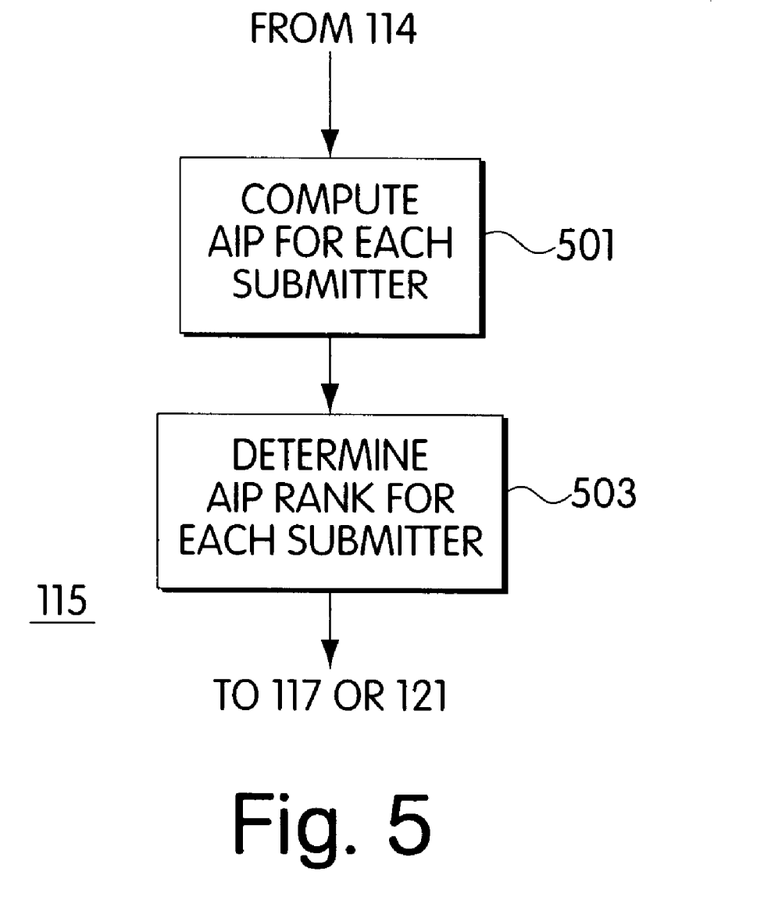
FIG. 5 is a detailed flowchart of block 115 of the flowchart of FIG. 1.

FIG. 5 shows the steps involved in grading Item submitters. First, the Average Item Power (AIP) is computed (501). Then the submitters are ranked by AIP (503). Each Item submitter's absolute level of achievement on the test is the AIP (Average Item Power) of hisher/their submitted items. Each Item submitter's relative level of achievement on the test (compared with all of the other Item submitters who submitted items for that test) is the rank of that Item submitter's AIP, or AIP RANK.

Information that should be provided to each participant should include, for each test item, the number of responses to each foil by the HG and the LG, the k, D and EP for each item, which foil is the "correct" answer, the answer selected by that Test taker for each item, that Test taker's Raw Score, Refined Score, and that Test taker's Raw and Refined Ranks.

Cheating

In many situations in which the testing method just described is employed, some or all of the Item submitters are also the Test takers for that submitted test. That fact raises the possibility that the Item submitter may encounter one or more of the questions he or she submitted while taking the test. However, should that actually happen, it is still not easy for the Item submitter to determine how he or she should answer the question. From the point of view of an Item submitter, the best answer to a question is the one foil which, if that foil were chosen as the "correct" answer by that Item submitter, would attain the highest k value. Hence, an Item submitter confronting an item which he or she has submitted must decide whether he or she as a Test taker is likely to score in the lowest third or forth of all of those Test takers taking that test and, if so, to answer that submitted item incorrectly or (if allowed) to omit answering that item. To answer each of one's own submitted item(s) "correctly" and then to score low enough for one's test to be assigned to the LG considerably reduces the power attained by each such item. The smaller the number in the group taking the test, the greater is that reduction in attained power.

Several factors further mitigate against Item submitters sharing information with other Item submitters about the contents of their items and which of the foils in each of their items is the "correct" answer. As the number of available Test takers increases, more groups of Test takers can be formed to decrease or reduce to zero the likelihood of any Item submitter serving as a Test taker of a test on which that Item submitters item(s) appear(s). Item submitters further may not know one another or be able to identify one another if the Item submitters are geographically and/or temporally dispersed. However, even if all Test takers are to be the Item submitters for those items on that test, those who understand the nature of the system are reluctant to share their "correct" answers with one another for at least two reasons. One is that the difficulty of deciding whether to answer each such item "correctly" or "incorrectly" must then be dealt with, not only on those items which that Item submitter has submitted but on those other items about which that Item submitter has been given knowledge by another Item submitter of the "correct" answer. Another factor suppressing Item submitters who then become Test takers on a test of their own items from sharing information with one another is that, if such information is fully shared, all Test takers will achieve the same or almost the same Raw Score, and there will be no ability to form two groups of high and low, and that test will thereby be invalid. And if such information is shared among a few such Item submitters, the distribution of scores will tend to be bimodal, and the coalition that shared information will subsequently tend to encounter an anti-coalition coalition on the next test, thus producing an invalid test or a test with extremely few or no Power Items.

MASTERY Communities

The technique for learning a body of knowledge and demonstration mastery of it by writing questions that was described in the parent of the present patent application will be termed in the following MASTERY. What brings people who participate in MASTERY together is the desire to learn about a given body of knowledge. MASTERY participants are thus naturally grouped into MASTERY communities organized around various bodies of knowledge. For a given exploration of a body of knowledge by a MASTERY community, all members of the community must have equal access to the materials being studied. These materials are termed the corpus for the exploration. In order for MASTERY scoring to remain valid across multiple rounds of an exploration by a community, the materials used for the multiple rounds of MASTERY must remain constant. As study and testing progresses, the test questions and results are added to the corpus. Questions used in one round may be revised and resubmitted for the next round.

The generation, assembly and presentation of these study materials can take any form, limited only by imagination: a book, a video, a movie, a play, a CD-ROM or a video or audio stream. If there is an agreed upon content expert within the community, then the resources designed or provided by this expert can serve, in full or in part, as the material to be explored. If there are multiple perspectives of expertise, then study materials need to be approved by the community and assembled. For a more diverse learning exploration, the community can generate information from a variety of sources and assemble this information into study materials. For instance, if MASTERY is used to explore current events, the body of materials could take the form of bookmarked online news services (CNN, CBS). These resources would provide the articles for study. Each perspective from within the community could find a news service that reflects its point of view.

Within a MASTERY community, community members are sources of questions, (Sources), respondents to questions (Respondents), or evaluators of questions (Evaluators). An evaluator of a question makes a determination based on his or her understanding of the corpus whether a question is a power item. The roles are not mutually exclusive; as mentioned in the parent, the extent to which a participant in MASTERY has mastered the material of the corpus may be measured both by his or her ability to write power items and his ability to answer items, and it may be additionally measured by his or her ability to predict whether an item is a power item. As pointed out in the parent, MASTERY works even where a test includes items for which at least some of those taking the test were the source. Of course, where the community is large enough, it should be divided into groups, with questions from one group being used by the other groups. For example, if there are four groups, the questions produced by a given group would appear in tests taken by the other three groups, but not in the tests taken by the given group.

Members of a MASTERY community may be involved in many different fashions. The fashion described in the parent is the Challenge Mode, where participants in MASTERY do so to increase their scores as Sources and Respondents. Other modes include the Observation Mode;

the Play for Fun Mode;

the Entrepreneurial Mode; and the Research Mode.

The Observation Mode deals with (a) Variable Entry Variable Exit issues or (b) Participants who are not ready to get their feet wet. An individual operating in Observation Mode has access to the corpus. In this mode, players can assist in the question creation or review processes, take part in seminars that teach the corpus, predict item power, and take the test (which is scored, but those scores are not used in computing test results). Players in the Observation Mode can help create, review and revise questions prepared by those in other Modes of play, but receive no power rating for any of the questions submitted.

The Play for Fun Mode is for those players who view learning as entertainment. Scoring is an option in that mode and players can choose their results from a menu of options. The Entrepreneurial Mode is designed for MASTERY community builders, that is, someone (a professor or a corporate trainer, for example) who has developed a corpus for exploration and has a community which is interested in exploring it. MASTERY resources and tools are provided to the community builder so that he or she can make the corpus's community into a MASTERY community.

The Research Mode, finally, is a mode in which academic scholars and researchers are provided data about community members and about test results that they can analyze and investigate as social scientists. Examples of areas for which MASTERY data might be of interest to researchers include most effective means of delivering content;

effect of being a Source, Evaluator, or Respondent on knowledge creation, sharing, and velocity;

determining power of various measures of learning to predict future performance;

measuring test reliability and validity;

correlation of measures of performance as a Source, Evaluator, or Respondent; and testing the effectiveness of a teacher's test making ability and using the result for evaluating teachers.

One of the functions of a MASTERY community is to provide its members with help. Among the ways it can provide help are organizing the members into teams, teaching the members the corpus, and teaching them how to write power items. Once MASTERY scores are available for community members, teams may be made by pairing community members with the lowest scores with those with the highest scores. The information needed to make the pairings comes from profiles of the community members. In making the pairings, the AQP, RawSc, RefPr, PAQP, GLAQP, and RQPP scores may be used, as well as other measures. AQP and RawSc have been explained in the parent; RefPR and RQPP will be explained below. PAQP and GLAQP are used to determine the quality of a given pairing as a learning environment. PAQP is the average question power for the questions authored by a given pair for a given round; GLAPQ is the gain in the lower of the pair's question power from the previous round to the current round. Low PAQP players and high PAQP players from a given round are paired in the next round.

Members of a MASTERY community can choose to become peer tutors or coaches. If a MASTERY community is Web-based, would-be tutors can provide their email addresses and times of availability to the community and the community can use the profiles of the tutors and tutees to make the proper pairings. An example of such help would be help in making questions. Of course, the tests would be arranged so that none of those engaged in providing help will take tests containing the questions they provided help for. Help can be provided through email, Ichat, instant message, seminars, web boards or other channels of internet communication. One example here is seminars that are structured chat formats with an experienced peer coach as a monitor who stimulates thought on question creation and keeps the discussions in the seminar lively and on track.

Interactive Test Taking

In an interactive medium such as is provided by either individual computer systems or computer systems linked by networks such as the World Wide Web, tests may be taken interactively, with immediate feedback to the user as to whether the answer is correct. In MASTERY, the test taker who has selected the wrong answer for a multiple-choice question may be given the option of selecting one of the remaining answers, with this process continuing until the correct answer is selected.

Scoring under such circumstances must of course take into account the fact that the number of remaining responses decreases with each incorrect answer, and consequently, the probability of selecting the correct answer increases. Put another way, the more tries it takes to come up with the correct answer, the less the correct answer is worth, and its value should diminish accordingly. One way to do this would be to weight the value of the answer according to the probability of making a choice that is not the correct answer. Thus, if all of the wrong answers have been chosen, leaving only the correct answer, the probability of not choosing the correct answer is 0 and the value of the correct answer when finally chosen is 0. On the other hand, if there are still four choices to make, the probability of not choosing the right answer is 0.75 and the value of the answer when chosen is multiplied by 0.75. In a preferred embodiment, the score calculated as just described is called the Total Responses, or TR, and it is provided along with the number answered correctly on the first try (#C), the number answered incorrectly on the first try (#I), and the number of final responses (FR), where FR=#C-#I. The Average Question Power (AQP) may then be computed from FR and TR as follows:

$$AQP = aFR + bTR + c$$

where a and b are the relative rates of FR and TR in the computation.

Additional Measures of Performance in MASTERY

Further research into MASTERY has resulted in the discovery of a number of new ways of measuring a participant's performance (where a participant may be an individual or a teamn) and of measuring the reliability and validity of the tests. Explanations of these new measuring techniques follow:

Refined Proportion

One of the measures disclosed in the parent is the Refined Score, which is the number of correct answers by a participant of questions belonging to a Refined Test. The Refined Test consists of items whose power is above a predetermined threshold. When large populations play MASTERY, multiple tests will be created. Each test created by the community will be unique. There will be variance in the number of power questions per test. Refined Proportion, or RefPr, is a measure designed to account for this variance. The Refined Proportion is the number of correct answers to power questions by each participant divided by the total number of power questions on the test taken. This ratio accounts for the possible variance of power questions across the tests created.

I. Predicted Power

Each participant, while answering each question on the test, makes a prediction of the power (RQPP) of that question. There are three choices: (1) the question is powerful; (2) the question is powerless or (3) the player can choose no power response to that question. There are four possible ways of scoring the prediction:

(a) Number of predicted powers that prove to be powers plus the number of powerless predictions that prove to be powerless (b) the same as (a) minus the number of power predictions that prove to be powerless and minus the number of powerless predictions that prove to have power (c) same as (a) but only counted if question is answered correctly and (d) is same as (b) but only counted if question is answered correctly.

As explained above, each participant in MASTERY performs in three communicative relationship roles: As a Source {S}, as a Respondent {R} and as an Evaluator (E). information. The Average Question Power (AQP) measure disclosed in the parent measures the performance of the participant as an S; Refined Proportion (RefPr) measures R; RQPP, finally, gives MASTERY a measure of performance as an E.

Measuring Test Quality

Measuring Intratest Reliability

This can be done using the item power for each item of the test. A 36-question test is large enough for the results of this measure to be meaningful. First, the test is divided into thirds, with 12 questions in each third. Then the item power of the questions in each third is summed. If there is a significant difference in the sums of the thirds, place one question from each participant in a different third of the test.

Measuring Test Validity

The more (or more powerful) power items a test has, the greater its validity. Test validity can thus be measured by the number of power items the test has or by the average power of the items in the test. The latter is computed by summing the powers of the power items and dividing the sum by the number of questions in the test. The average power is also a measure of the cumulative performance as a Source of the group that provided the questions for the test.

Conclusion

The foregoing Detailed Description has disclosed how the techniques of the parent of the present application may be used to form MASTERY communities, how mastery of a community's corpus of information by a member of the community may be evaluated in terms of his or her ability to answer questions about the corpus, to write questions about the corpus that discriminate between those who have mastered the information and those who have not, and to predict whether a given question will discriminate. It has also disclosed various modes of community membership and techniques whereby community members may help each other master the corpus. The World Wide Web has made interactive test making simple, and MASTERY's scoring has been improved to take into account the number of attempts a test taker makes before giving the right answer to the question. The measurements have further been improved to take into account variations due to multiple tests and to provide measurements of test validity.

The inventors of the present application have disclosed the best techniques presently known to them of implementing their inventions. However, as will be immediately apparent to those active in the technologies to which the invention pertains, there are many detailed ways of implementing the principles of the techniques disclosed herein. Since that is so, the Detailed Description is to be regarded as being in all respects exemplary and not restrictive, and the breadth of the invention disclosed here in is to be determined not from the Detailed Description, but rather from the claims as interpreted with the fill breadth permitted by the patent laws.

What is claimed is:

1. A method of determining mastery of information in a corpus thereof by members of a set of participants, the method comprising the steps of:

having a first subset of the set of participants provide objectively-gradable test items about the information in the corpus;

having a second subset of the set of participants answer the test items;

objectively grading the answered test items; and determining each participant's mastery by objectively analyzing the grades
to determine for each participant in the second subset of the set of participants the extent to which the participant had answered the test items correctly and
to determine for each participant in the first subset of the set of participants the extent to which the test items provided by the participant discriminated between those in the second subset who did well answering the test items and those who did not.

2. The method of determining mastery set forth in claim 1 further comprising the step of:

having each participant in a third subset of the set of participants predict whether each of the test items in the test would discriminate between those in the second subset who did well answering the test items and those who did not; and in the step of determining, determining mastery for each participant in the third subset by how well each participant predicted whether each of the test items would discriminate.

3. The method of determining mastery set forth in claim 2 wherein the second subset and the third subset are substantially identical.

4. The method set forth in claim 3 wherein:

the first subset, the second subset, and the third subset are substantially identical.

5. The method set forth in any one of claims 1 through 4 wherein:

the second subset of participants answers the items interactively, with attempts to answer continuing for each item until the correct answer is given; and the value of a given item in determining whether a given member of the second subset has mastered the corpus is decreased as the number of attempts by the given member to answer the given item increases.

6. The method set forth in any one of claims 1 through 4 further comprising the step of:

organizing the first subset of participants into teams for producing the objectively gradable test items such that each team includes a participant who has been previously determined to have good mastery of the corpus and a participant who has been previously determined to have poor mastery of the corpus.

7. The method set forth in any one of claims 1 through 4 wherein:

the corpus, the test items, and the results of the objective analysis are accessible to the set of participants via a network; and the step of having the second subset of the set of participants answer the test items is done interactively via the network.

8. The method set forth in any one of claims 1 through 4 wherein:

the set of participants further includes a fourth subset thereof that is willing to provide help in mastering the corpus and a fifth subset thereof that is seeking help and the method further comprises the step of:

associating a member of the fourth subset with a member of the fifth subset according to determinations of the members' mastery of the corpus.

\* \* \* \* \*